United States Patent
Liu et al.

(10) Patent No.: US 7,573,834 B2
(45) Date of Patent: Aug. 11, 2009

(54) METHOD AND SYSTEM FOR ALLOCATING A GROUP BIT RATE AMONG MULTIPLE BONDED PAIRS IN A COMMUNICATIONS NETWORK

(75) Inventors: Bo Liu, Kanata (CA); Frank Jurgen Gilbert Devolder, Bonheiden (BE); Wensheng Li, Kanata (CA)

(73) Assignee: Alcatel Lucent, Paris (FR)

( * ) Notice: Subject to any disclaimer, the term of this patent is extended or adjusted under 35 U.S.C. 154(b) by 499 days.

(21) Appl. No.: 11/443,413

(22) Filed: May 31, 2006

(65) Prior Publication Data

US 2007/0280126 A1   Dec. 6, 2007

(51) Int. Cl.
    *H04L 12/26*   (2006.01)
(52) U.S. Cl. .................. 370/252; 370/232; 370/468; 370/535
(58) Field of Classification Search .............. 370/230, 370/231, 232, 233, 234, 252, 253, 395.1, 370/463, 468, 477, 535, 538, 543, 544, 545
See application file for complete search history.

(56) References Cited

U.S. PATENT DOCUMENTS

| | | | |
|---|---|---|---|
| 6,856,947 B2 * | 2/2005 | Antoine et al. | 702/189 |
| 2003/0031239 A1 * | 2/2003 | Posthuma | 375/222 |
| 2003/0117963 A1 * | 6/2003 | Wang | 370/252 |
| 2007/0036339 A1 * | 2/2007 | Cioffi et al. | 379/399.01 |

OTHER PUBLICATIONS

Draft Amendment to—Information Technology—Telecommunications and information exchange between systems . . . 2004; IEEE Draft P802.3ah/D3.1 IEEE Standards Department.
Series G: Transmission Systems and Media, Digital Systems and NetworksDigital sections and digital line system—Access networks; ATM-based Multi-Pair Bonding; ITU-T G.998.1.
Series G: Transmission Systems and Media, Digital Systems and NetworksDigital sections and digital line system—Access networks; Ethernet-based Multi-Pair Bonding; ITU-T G.99.

* cited by examiner

*Primary Examiner*—Ricky Ngo
*Assistant Examiner*—Wei-Po Kao

(57) ABSTRACT

A method for allocating a group bit rate among each line in a group of bonded lines in a communications network, the method comprising: receiving first and second actual bit rates ($ACT_1$, $ACT_2$) for first and second lines (L1, L2) of the group (G), respectively; calculating a splitting ratio (X) of the second actual bit rate to the first actual bit rate ($X=ACT_2/ACT_1$); if the splitting ratio (X) is within a predetermined range, determining ones of first and second minimum bit rates ($MIN_1$, $MIN_2$) and first and second maximum bit rates ($MAX_1$, $MAX_2$) for the first and second lines (L1, L2), respectively, from ones of the splitting ratio (X), a group minimum bit rate ($MIN_G$), a group maximum bit rate ($MAX_G$), and first and second preconfigured minimum bit rates ($MIN_{L1}$, $MIN_{L2}$) for the first and second lines (L1, L2), respectively; and, configuring first and second transceivers for the first and second lines (L1, L2), respectively, with ones of the first and second minimum ($MIN_1$, $MIN_2$) and maximum ($MAX_1$, $MAX_2$) bit rates.

18 Claims, 3 Drawing Sheets

METHOD AND SYSTEM FOR ALLOCATING A GROUP BIT RATE AMONG MULTIPLE BONDED PAIRS IN A COMMUNICATIONS NETWORK

FIELD OF THE INVENTION

This invention relates to logical multi-pair bonding within communications networks, and more specifically, to a method and system for allocating a group bit rate among multiple logically bonded XDSL pairs in an ATM or Ethernet based communications network.

BACKGROUND OF THE INVENTION

Ethernet was originally defined in the early 1980s as a 10-Mbit/s shared-medium local area network ("LAN"), but has since been developed enormously and is now being deployed in access networks at speeds of up to 1 Gbit/s. Because Ethernet is so widely used, and virtually all networking starts and finishes through an Ethernet port on a personal computer ("PC") somewhere, using Ethernet as an access technology is being adopted by access network Service Providers ("SPs") in addition to asynchronous transfer mode ("ATM") services.

The case for Ethernet and ATM in the access network is tied to demand for the sorts of services that need high bandwidth. For example, video-based applications are pushing at the bounds of what conventional digital subscriber line ("DSL") services can deliver, forcing SPs to implement additional bandwidth-on-demand features into their DSL networks to support video-on-demand ("VOD"). Access standards such as International Telecommunication Union ("ITU") Telecommunication Standardization Sector ("ITU-T") G.998.1 ("ATM-Based Multi-Pair Bonding"), ITU-T G.998.2 ("Ethernet-Based Multi-Pair Bonding"), and Institute of Electrical and Electronics Engineers ("IEEE") 802.3ah ("Media Access Control Parameters, Physical Layers, and Management of Parameters for Subscriber Access Networks"), which are incorporated herein by reference, provide a partial answer to bandwidth requirements of this type. Note that the acronym "xDSL" or "XDSL" is commonly used to denote any of the various types of DSL technologies.

Consider the case of Ethernet. The local loop (or pair or line) is the all-important link between the end user and the SP's network. On one end of the loop is the SP's equipment, the access node, which resides at a central office ("CO") or point-of-presence ("POP"), acting as the gateway to the public network, directing data to and from the network core. On the other end of the loop is the subscriber. Currently, most subscribers connect to the SP's network using customer premises equipment ("CPE") for one of several access technologies: PSTN/ISDN, XDSL, cable, T1/E1, T3/E3, OC3/STM1, and so on. The CPE in this case, however, acts not just as a bridge, but as a translation point between the access network and the local Ethernet network. This adds a further level of network deployment and maintenance complexity for both the SP and the subscriber. In contrast, with IEEE 802.3ah Ethernet access the subscriber connects his Ethernet LAN directly to the access network with a simple, familiar, and native Ethernet interface. IEEE 802.3ah allows Ethernet to be deployed over the existing copper loop by using, at a minimum, a single copper pair.

By bonding multiple copper pairs together, higher bandwidth services may be provided over longer distances. The ITU-T G.998.1, ITU-T G.988.2, and IEEE 802.3ah standards allow standard XDSL technology to run at higher speeds over multiple bonded pairs. The bonded approach treats multiple copper lines as a unified physical layer, making it far more robust than traditional inverse multiplexing (e.g., inverse multiplexing for ATM ("IMA")) techniques. With respect to Ethernet, IEEE 802.3ah provides the ability to auto-detect which pairs are connected between two devices and are, therefore, eligible to be aggregated into a single Ethernet connection. Using this bonding auto-detection, SPs are not forced to configure the cross-connect information on each device. Instead, an IEEE 802.3ah-capable switch exchanges information to negotiate which pairs are connected to the same remote CPE system, and then creates an aggregate port from those pairs. Pairs can even come and go, being added and removed dynamically, without affecting the operational status of the aggregate port. In addition, IEEE 802.3ah provides an aggregation multiplexing and de-multiplexing layer into the Ethernet stack that is responsible for taking an Ethernet frame and partitioning it over multiple variable speed links in a manner that best utilizes the speed of each pair. For example, an implementation could partition a frame into variable size fragments, where the size of the fragments depends upon the speed of the link, with the faster links carrying the larger fragments.

Thus, using standards such as ITU-T G.998.1, ITU-T G.988.2, and IEEE 802.3ah a SP may use multiple DSL lines to carry a single ATM or Ethernet stream from a CO node to a CPE terminal in order to increase access bandwidth. This is advantageous as it is common for a subscriber's residence to have multiple twisted pairs available for connection to a CO, although only one pair is normally used. As such, logically bonding multiple pairs together can be used to increase access bandwidth to the subscriber's residence.

One problem with logically bonding multiple pairs together is that, in general, each pair has a different line rate and/or transmission characteristics due to, for example, differing noise levels, loading coils, lengths, etc. In addition, the line rate of each pair may be subject to multiple constraints that may be imposed by various standards, SPs, or the CPE system itself. This makes the manual splitting of a group rate among bonded pairs difficult and impractical when a large number of lines need to be configured by the SP. Therefore, effective automatic optimal allocation of bandwidth among the pairs is a critical aspect of any bonding implementation.

In particular, SPs typically have a large number of DSL subscribers that need to have their DSL service configured. The condition of DSL lines may be significantly different and multiple constraints may need to be met in the rate split. For example, subscribers may require that each of their lines meets a configured per-line minimum rate after the group rate split. As another example, standards typically specify a 4:1 line speed ratio, however, manual methods for rate splitting may not always guarantee this ratio. These constraints make manual rate splitting methods difficult, if not impossible, and hence an effective method for automatically splitting the group rate among bonded DSL lines is required.

However, while standards such as ITU-T G.998.1, ITU-T G.998.2, and IEEE 802.3ah may describe many aspects of the ATM-based and Ethernet-based bonding, they are silent with respect to the allocation of a group's bandwidth to lines within the group. In addition, techniques such as IMA for logically combining multiple physical links (e.g. DS1, E1, etc.) into one logical link require that all links must be of the same rate for synchronized framing. Hence, techniques such as IMA are not helpful as they do not require the allocation of a group bit rate among bonded lines.

A need therefore exists for an improved method and system for allocating a group bit rate among multiple logically bonded XDSL pairs in an ATM or Ethernet based communications network. Accordingly, a solution that addresses, at least in part, the above and other shortcomings is desired.

SUMMARY OF THE INVENTION

According to one aspect of the invention, there is provided a method for allocating a group bit rate among each line in a group of bonded lines in a communications network, the method comprising: receiving first and second actual bit rates ($ACT_1$, $ACT_2$) for first and second lines (L1, L2) of the group (G), respectively; calculating a splitting ratio (X) of the second actual bit rate to the first actual bit rate ($X=ACT_2/ACT_1$); if the splitting ratio (X) is within a predetermined range, determining ones of first and second minimum bit rates ($MIN_1$, $MIN_2$) and first and second maximum bit rates ($MAX_1$, $MAX_2$) for the first and second lines (L1, L2), respectively, from ones of the splitting ratio (X), a group minimum bit rate ($MIN_G$), a group maximum bit rate ($MAX_G$), and first and second preconfigured minimum bit rates ($MIN_{L1}$, $MIN_{L2}$) for the first and second lines (L1, L2), respectively; and, configuring first and second transceivers for the first and second lines (L1, L2), respectively, with ones of the first and second minimum ($MIN_1$, $MIN_2$) and maximum ($MAX_1$, $MAX_2$) bit rates.

In the above method, each line (L1, L2) may be an XDSL line and the communications network may be one of an Ethernet-based network and an ATM-based network. The predetermined range may be about 4:1. The first and second actual bit rates ($ACT_1$, $ACT_2$) may be received from the first and second transceivers while operating in a second rate adaptation mode in which the first and second transceivers train to the first and second actual bit rates ($ACT_1$, $ACT_2$), respectively, given the first and second preconfigured minimum bit rates ($MIN_{L1}$, $MIN_{L2}$) and first and second initial maximum bit rates for the first and second lines (L1, L2). If the first and second transceivers are to operate in a second rate adaptation mode wherein the first and second transceivers are provided with the first and second minimum ($MIN_1$, $MIN_2$) and maximum ($MAX_1$, $MAX_2$) bit rates and train to first and second bit rates, respectively, and remain at the first and second bit rates, then: the first minimum bit rate ($MIN_1$) may be given by a maximum of the group minimum bit rate ($MIN_G$) divided by the splitting ratio plus one (X+1) and the first preconfigured minimum bit rate ($MIN_{L1}$) (i.e., $MIN_1=\max\{1/(1+X)\times MIN_G, MIN_{L1}\}$); the first maximum bit rate ($MAX_1$) may be given by the group maximum bit rate ($MAX_G$) divided by the splitting ratio plus one (i.e., $MAX_1=1/(1+X)\times MIN_G$); the second minimum bit rate ($MIN_2$) may be given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2=\max\{X/(1+X)\times MIN_G, MIN_{L2}\}$); and, the second maximum bit rate ($MAX_2$) may be given by the group maximum bit rate ($MAX_G$) multiplied by the splitting ratio (X) divided by the splitting ratio plus one (X+1) (i.e., $MAX_2=X/(i+X)\times MIN_G$).

Also in the above method, if the first minimum bit rate ($MIN_1$) is greater than the first maximum bit rate ($MAX_1$) (i.e., $MIN_1>MAX_1$), then: the second minimum bit rate ($MIN_2$) may be given by a maximum of a difference between the group minimum bit rate ($MIN_G$) and the first minimum bit rate ($MIN_1$) and the second preconfigured minimum bit rate ($MIN_{L2}$) (i.e., $MIN_2=\max\{(MIN_G-MIN_1), MIN_{L2}\}$); the splitting ratio (X) may be of the second minimum bit rate ($MIN_2$) to the first minimum bit rate ($MIN_1$) (i.e., $X=MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D=MAX_G-(MIN_1+MIN_2)\geq 0$), then: the first maximum bit rate ($MAX_1$) may be given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1=MIN_1+1/(1+X)\times MAX_D$); and, the second maximum bit rate ($MAX_2$) may be given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2=MIN_2+X/(1+X)\times MAX_D$).

Also in the above method, if the second minimum bit rate ($MIN_2$) is greater than the second maximum bit rate ($MAX_2$) (i.e., $MIN_2>MAX_2$), then: the first minimum bit rate ($MIN_1$) may be given by a maximum of a difference between the group minimum bit rate ($MIN_G$) and the second minimum bit rate ($MIN_2$) and the first preconfigured minimum bit rate ($MIN_{L1}$) (i.e., $MIN_1=\max\{(MIN_G-MIN_2), MIN_{L1}\}$); the splitting ratio (X) may be of the second minimum bit rate ($MIN_2$) to the first minimum bit rate ($MIN_1$) (i.e., $X=MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D=MAX_G-(MIN_1+MIN_2)\geq 0$), then: the first maximum bit rate ($MAX_1$) may be given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1=MIN_1+1/(1+X)\times MAX_D$); and, the second maximum bit rate ($MAX_2$) may be given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2=MIN_2+X/(1+X)\times MAX_D$).

Also in the above method, if the first and second transceivers are to operate in a first rate adaptation mode wherein the first and second transceivers are provided with the first and second minimum bit rates ($MIN_1$, $MIN_2$) and first and second planned bit rates ($PLAN_{L1}$, $PLAN_{L2}$) for the first and second lines (L1, L2), respectively, then: the first minimum bit rate ($MIN_1$) may be given by a maximum of the group minimum bit rate ($MIN_G$) divided by the splitting ratio plus one (X+1) and the first planned bit rate ($PLAN_{L1}$) (i.e., $MIN_1=\max\{1/(1+X)\times MIN_G, PLAN_{L1}\}$); and, the second minimum bit rate ($MIN_2$) may be given by a maximum of the group minimum bit rate ($MIN_G$) multiplied by the splitting ratio (X) divided by the splitting ratio plus one (X+1) and the second planned bit rate ($PLAN_{L2}$) (i.e., $MIN_2=\max\{X/(1+X)\times MIN_G, PLAN_{L2}\}$).

Also in the above method, if the first transceiver is to operate in a first rate adaptation mode wherein the first transceiver is provided with the first minimum bit rate ($MIN_1$) and a first planned bit rate ($PLAN_{L1}$) for the first line (L1) and if the second transceiver is to operate in a second rate adaptation mode wherein the second transceiver is provided with the second minimum ($MIN_2$) and maximum ($MAX_2$) bit rates and trains to a second bit rate and remains at the second bit rate, then: the first minimum bit rate ($MIN_1$) may be given by a maximum of the group minimum bit rate ($MIN_G$) divided by the splitting ratio plus one (X+1) and the first planned bit rate ($PLAN_{L1}$) (i.e., $MIN_1=\max\{1/(1+X)\times MIN_G, PLAN_{L1}\}$); the second minimum bit rate ($MIN_2$) may be given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2 = \max\{X/(1+X) \times MIN_G, MIN_{L2}\}$); and, the second maximum bit rate ($MAX_2$) may be given by the group maximum bit rate ($MAX_G$) less the first minimum bit rate ($MIN_1$) (i.e., $MAX_2 = MAX_G - MIN_1$).

In accordance with further aspects of the present invention there is provided an apparatus such as a data processing system (e.g., a network element, a network management system, etc.), a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network elements and network management systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

The present invention provides a method to automatically split a configured bonding group rate among DSL lines that are logically bonded into a group using, for example, ATM-based bonding or Ethernet-based bonding, to increase access bandwidth to a given CPE terminal. As such, the present invention addresses vendor specific implementation aspects of the bonding standards ITU-T G.998.1 for ATM-based bonding and ITU-T G.998.2 (or IEEE 802.3ah) for Ethernet-based bonding. The improved group rate split method of the present invention optimally allocates bandwidth according to each line's achievable rate while taking into account multiple other constraints (e.g., link speed ratio, minimum required per-line rate, etc.).

Figure 1:
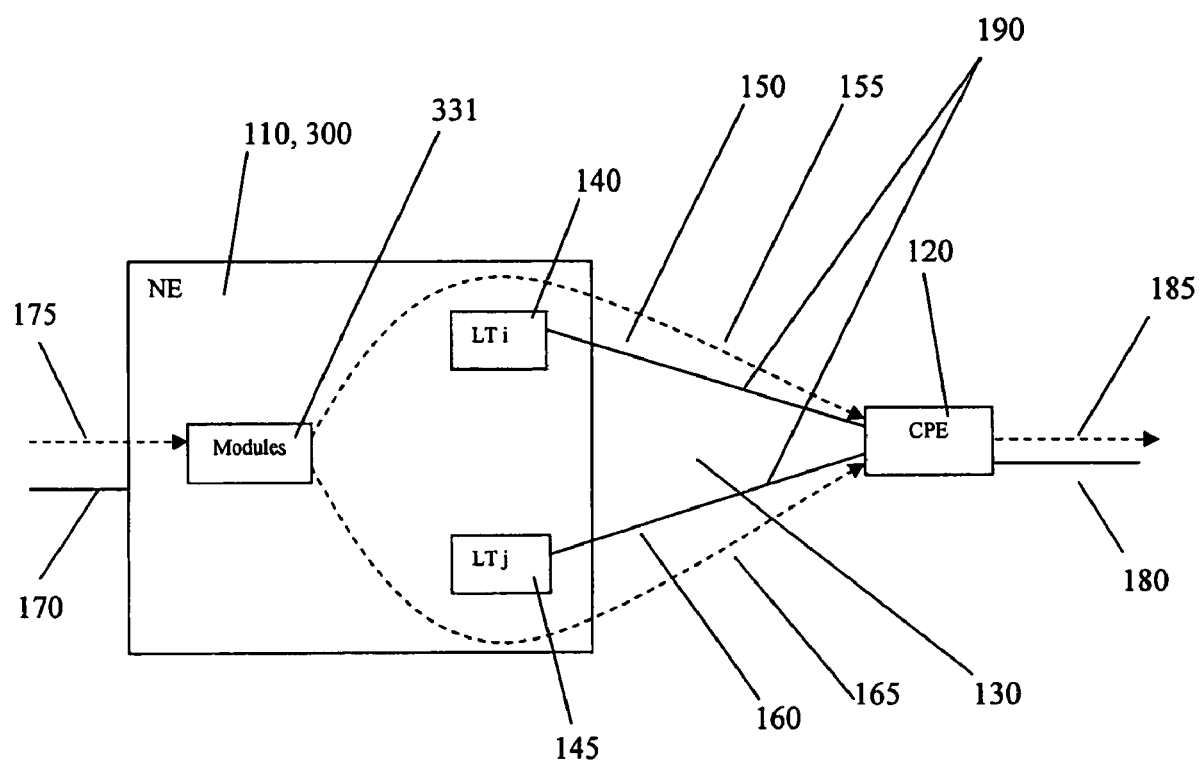
FIG. 1 is a block diagram illustrating a communications system for providing Ethernet and/or ATM service to subscribers in accordance with an embodiment of the invention.

FIG. 1 is a block diagram illustrating a communications system 100 for providing Ethernet and/or ATM service to subscribers in accordance with an embodiment of the invention. The communications system 100 includes a network element ("NE") system 110 coupled to a customer premises equipment ("CPE") system 120 over an access network 130. The NE 110 may be maintained by a service provider ("SP") to provide Ethernet and/or ATM service to a subscriber or user of the CPE 120. According to one embodiment, the NE 110 is a switch located at the SP's central office ("CO"). According to another embodiment, the NE 110 is a remote unit (i.e., remote from the CO). According to one embodiment, the CPE 120 is a personal computer ("PC") or server located at the subscriber's or user's premises or residence. The NE 110 receives "bonded" input Ethernet or ATM traffic 175 over and incoming network link 170. The bonded traffic 175 may be received by a network termination ("NT") card (not shown) within the NE 110. As will be described in more detail below, the NE 120 includes hardware and/or software modules 331 for bit rate splitting the bounded traffic 175 to produce two or more "bonding" traffic streams 155, 165. In FIG. 1, two bonding traffic streams 155, 165 are shown but, of course, the number of bonding traffic streams may be greater than two. Each of the bonding traffic streams 155, 165 is transmitted over a respective XDSL pair or line 150, 160 via a respective line termination ("LT") card $LT_i$ 140, $LT_j$ 145 to the CPE 120. The access network 130 in this example consists of two XDSL lines 150, 160. The CPE 120 receives the bounding traffic streams 155, 165 from the XDSL lines 150, 160 and aggregates or combines the bounding traffic streams 155, 165 to produce output bonded traffic 185 for use by the CPE 120 or for transmission over a local area network ("LAN") 180 to other subscriber systems (not shown). The two XDSL lines 150, 160 from an aggregation group, bonding group, or logical group 190.

Figure 2:
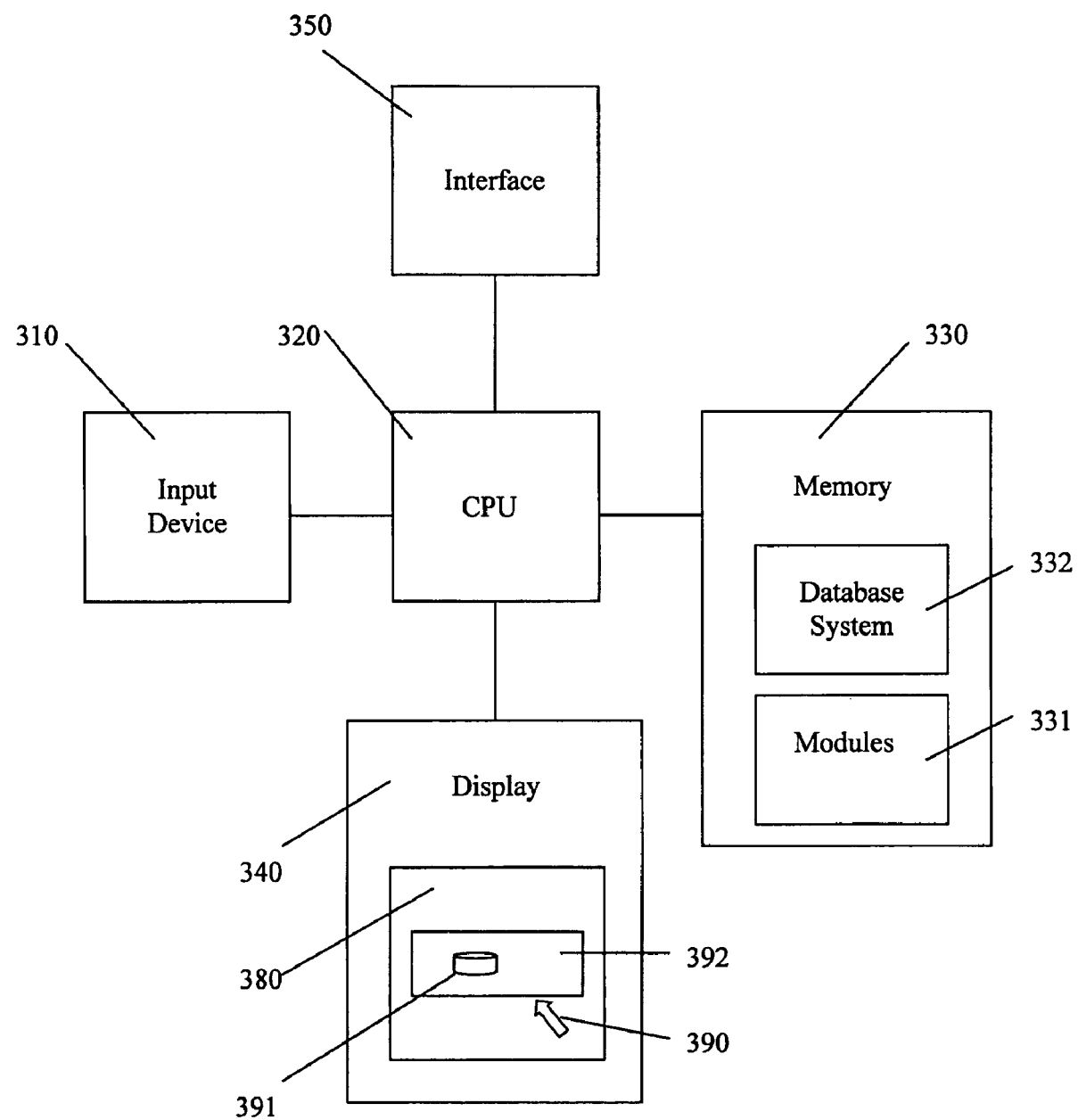
FIG. 2 is a block diagram illustrating a data processing system adapted to implement an embodiment of the invention; and, FIG. 3 is a flow chart illustrating operations of modules within the memory of a data processing system for allocating a group bit rate among each line in a group of bonded lines in a communications network, in accordance with an embodiment of the invention.

FIG. 2 is a block diagram illustrating a data processing system 300 adapted to implement an embodiment of the invention. The data processing system 300 is suitable for operation as a NE system 110, a CPE system 120, a network management system ("NMS") (not shown) for monitoring and controlling NEs in the communications system 100, or other NEs (e.g., a remote units) in the communications system 100. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection (e.g., an Ethernet and/or ATM based network connection, NTs, $LT_i$ 140, $LT_j$ 145, etc.). The input device 310 may include a keyboard, a mouse, a trackball, or a similar device. And, the display 340 may include a computer screen, terminal device, or a hardcopy producing output device such as a printer or plotter. The data processing system 300 is adapted for communicating with other data processing systems (e.g., 110 or 120) over a network 130 via the interface device 350. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

The data processing system 300 may be a NE system 110, a CPE system 120, a switch, server system, or PC system. The CPU 320 of the system 300 is operatively coupled to memory 330 which stores an operating system (not shown) for general management of the system 300. The interface 350 may be used for communicating to external data processing systems (e.g., 110 or 120) through a network 130. The system 300 may include application server software (not shown) for developing and managing distributed applications. The CPU 320 of the system 300 is typically coupled to one or more devices 310 for receiving user commands or queries and for displaying the results of these commands or queries to the user on a display 340. As mentioned, the memory 330 may include a variety of storage devices including internal memory and external mass storage typically arranged in a hierarchy of storage as understood to those skilled in the art.

A user may interact with the data processing system 300 and its hardware and software modules 331 using an optional graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Thus, the data processing system 300 includes computer executable programmed instructions for directing the system 300 to implement the embodiments of the present invention. The programmed instructions may be embodied in one or more hardware modules or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

Now, as mentioned above, in ATM-based or Ethernet-based bonding, multiple pairs (or lines or links) 150, 160 can be bonded to form a bonding group 190 as illustrated in FIG. 1. The bonding group 190 is configured with a minimum bit rate and a maximum bit rate. The problem is to split these group rates on each line 150, 160 of the group 190 to optimize the use of each line according to its transmission characteristics and taking into account multiple constraints. According to one embodiment of the invention, this may be accomplished using a two-stage method as described below. This description is based on a two-pair 150, 160 bonding scenario, however, the method is applicable to a bonding scenario involving more than two pairs.

Stage 1: Determine the maximum achievable bit rate of each line 150, 160 in the group 190. This is accomplished by configuring the modems or transceivers (e.g., within $LT_i$ 140, $LT_j$ 145) of the first line ("L1") 150 and the second line ("L2") 160 in Rate Adaptation ("RA") Mode 2 (i.e., overrule the RA mode configured in the XDSL profile) and with the following bit rates:

$MIN_1 = MIN_{L1}$;
$MAX_1 = 65{,}535$ kbit/s;
$MIN_2 = MIN_{L2}$; and,
$MAX_2 = 65{,}535$ kbit/s, where $MIN_{L1}$ and $MIN_{L2}$ are the configured per-line minimum bit rates of L1 150 and L2 160, respectively, $MIN_1$ and $MIN_2$ are variables representing the minimum bit rates assigned to L1 150 and L2 160, respectively, and $MAX_1$ and $MAX_2$ are variables representing the maximum bit rates assigned to L1 150 and L2 160, respectively. Note that $MIN_1$, $MIN_2$, $MAX_1$, $MAX_2$, being variables, may be assigned different values at different stages in the method. Also note that $MIN_{L1}$ and $MIN_{L2}$ are configured via the XDSL service profiles (see below) assigned to L1 150 and L2 160, respectively. Further note that the 65,535 kbit/s initial rate for $MAX_1$ and $MAX_2$ is exemplary only and may change depending on the implementation. Both lines 150, 160 start initializing using this (temporary) configuration.

Note that the RA mode referred to above is a downstream rate adaptation mode defined in the ITU-T G.997.1 ("Physical Layer Management for Digital Subscriber Line (DSL) Transceivers") standard, which is incorporated herein by reference. Three modes are defined in ITU-T G.997.1 as follows: Mode 1 or "MANUAL" wherein the rate is changed manually; Mode 2 or "AT_INIT" wherein the rate is automatically selected at startup only and does not change after that; and, Mode 3 or "DYNAMIC" wherein the rate is automatically selected at initialization and is continuously adapted during operation (i.e., "showtime"). Also note that the "downstream" direction is from the NE 110 (e.g., at the CO) to the CPE 120 (i.e., at the subscriber's premises) while the "upstream" direction is in the opposite direction. Further note that a transceiver at the NE 110 (e.g., at the CO) may be referred to as an ADSL Transceiver Unit—Central office end ("ATU-C") while a transceiver at the CPE 120 (e.g., at the subscriber's premises) may be referred to as an ADSL Transceiver Unit—Remote terminal end ("ATU-R"). XDSL Transceiver Units ("XTUs") may be correspondingly referred to using the acronyms "XTU-C" and "XTU-R". Finally, note that note that "showtime" is the state of either XTU-C or XTU-R when all initialization and training is completed and during which user data may be transmitted.

Stage 2: Split the group rate taking into account the maximum achievable rates of the DSL lines 150, 160 as well as multiple other constraints. This is accomplished as follows.

When both lines 150, 160 are in showtime, retrieve the actual bit rates of both lines, $ACT_1$ and $ACT_2$, respectively.

Next, calculate a splitting ratio X given by $X = ACT_2/ACT_1$.

If $ACT_1$ and $ACT_2$ are within a 4:1 ratio, reconfigure both lines 150, 160 in the RA mode specified in the XDSL profile and with the bit rates given in the following. Note that the 4:1 ratio is suggested by the ITU-T G.997.1 standard. This 4:1 ratio, of course, may be another value.

If both lines are in RA Mode 2:
$MIN_1 = \max\{1/(1+X) \times MIN_G, MIN_{L1}\}$;
$MAX_1 = 1/(1+X) \times MAX_G$;
$MIN_2 = \max\{X/(1+X) \times MIN_G, MIN_{L2}\}$; and,
$MAX_2 = X/(1+X) \times MAX_G$, where $MIN_G$ and $MAX_G$ are the configured group minimum bit rate and group maximum bit rate, respectively; $MIN_{L1}$ and $MIN_{L2}$ are the configured per-line minimum bit rates of L1 150 and L2 160, respectively; and, max {a, b} returns the value of the larger of a and b. Note that $MIN_G$ and $MAX_G$ are configured via a bonding group configuration profile for the group that is maintained in the memory 330, 331 of the NE 110, NMS, or data processing system 300. The bonding group configuration profile groups all parameters at the bonding group level.

In the above, if $MIN_1 > MAX_1$:
$MIN_2 = \max\{(MIN_G - MIN_1), MIN_{L2}\}$;
$X = MIN_2/MIN_1$; and,
$MAX_D = MAX_G - (MIN_1 + MIN_2)$,
where if $MAX_D \geq 0$:
$MAX_1 = MIN_1 + 1/(1+X) \times MAX_D$; and,
$MAX_2 = MIN_2 + X/(1+X) \times MAX_D$.
In the above, else if $MIN_2 > MAX_2$:
$MIN_1 = \max\{(MIN_G - MIN_2), MIN_{L1}\}$;
$X = MIN_2/MIN_1$; and,
$MAX_D = MAX_G - (MIN_1 + MIN_2)$,
where if $MAX_D \geq 0$:
$MAX_1 = MIN_1 + 1/(1+X) \times MAX_D$; and,
$MAX_2 = MIN_2 + X/(1+X) \times MAX_D$.
In the above, $MAX_D$ is a variable as defined.

If both lines 150, 160 are in RA Mode 1:
$MIN_1 = \max\{1/(1+X) \times MIN_G, PLAN_{L1}\}$; and,
$MIN_2 = \max\{X/(1+X) \times MIN_G, PLAN_{L2}\}$, where $PLAN_{L1}$ and $PLAN_{L2}$ are the planned bit rates of L1 150 and L2 160, respectively. Note that $PLAN_{L1}$ and $PLAN_{L2}$ are configured via the XDSL service profiles for L1 and L2 (see below).

If one line (e.g. L1 150) is in RA Mode 1 and another line (e.g. L2 160) in RA Mode 2:
$MIN_1 = \max\{1/(1+X) \times MIN_G, PLAN_{L1}\}$;
$MIN_2 = \max\{X/(1+X) \times MIN_G, MIN_{L2}\}$; and,
$MAX_2 = MAX_G - MIN_1$.

Note that the XDSL profile referred to above includes a XDSL service profile and a XDSL spectrum profile according to ITU-T G.997.1. The XDSL service profile includes: upstream/downstream RA mode; upstream/downstream minimum bit rate; upstream/downstream planned bit rate; upstream/downstream maximum bit rate; and, upstream/downstream maximum interleave delay. The XDSL spectrum profile includes: operation mode ("OpMode"); upstream/downstream minimum noise margin; upstream/downstream target noise margin; upstream/downstream maximum noise margin; upstream/downstream carrier mask; and, other spectrum related parameters. The bonding group configuration profile referred to above may include parameters equivalent to those of the XDSL service and spectrum profiles. Parameters included in the XDSL and bonding group profiles may be configured by a user via the GUI 380 of the NE 110, 300 or NMS.

Both lines 150, 160 will then initialize using this (final) configuration. When both lines 150, 160 are in showtime, retrieve the actual bit rate of each line (i.e., $ACT_1$, $ACT_2$, respectively). If $ACT_1$ and $ACT_2$ are within a 4:1 ratio, the group 190 becomes operational.

The above method can be readily extended to cover the case where more than two pairs 150, 160 are bonded in a group 190 and/or more where more constraints are imposed.

The present invention provides several advantages. It enables automatic optimal configuration of ATM-based or Ethernet-based bonding, which is critical to SPs, especially the automatic aspect as SPs may have a large number of subscribers to configure, potentially very different line characteristics, as well as multiple additional constraints. It provides optimal implementation of the SP specific portions of the ITU-T G.998.1 and ITU-T G.998.2 (or IEEE 802.3ah) standards as it allows SPs to allocate group bandwidth optimally among a group's DSL links. It provides a method that can accommodate variations to address different situations having different constraints (e.g., such as that described above with respect to constraints imposed by standards as well as by operators). And, it allows SPs to provide more access bandwidth to existing subscribers hence enabling SPs to achieve higher service revenues through enhanced multi-tier pricing and to reach hitherto unreachable areas to expand their subscriber base.

Figure 3:
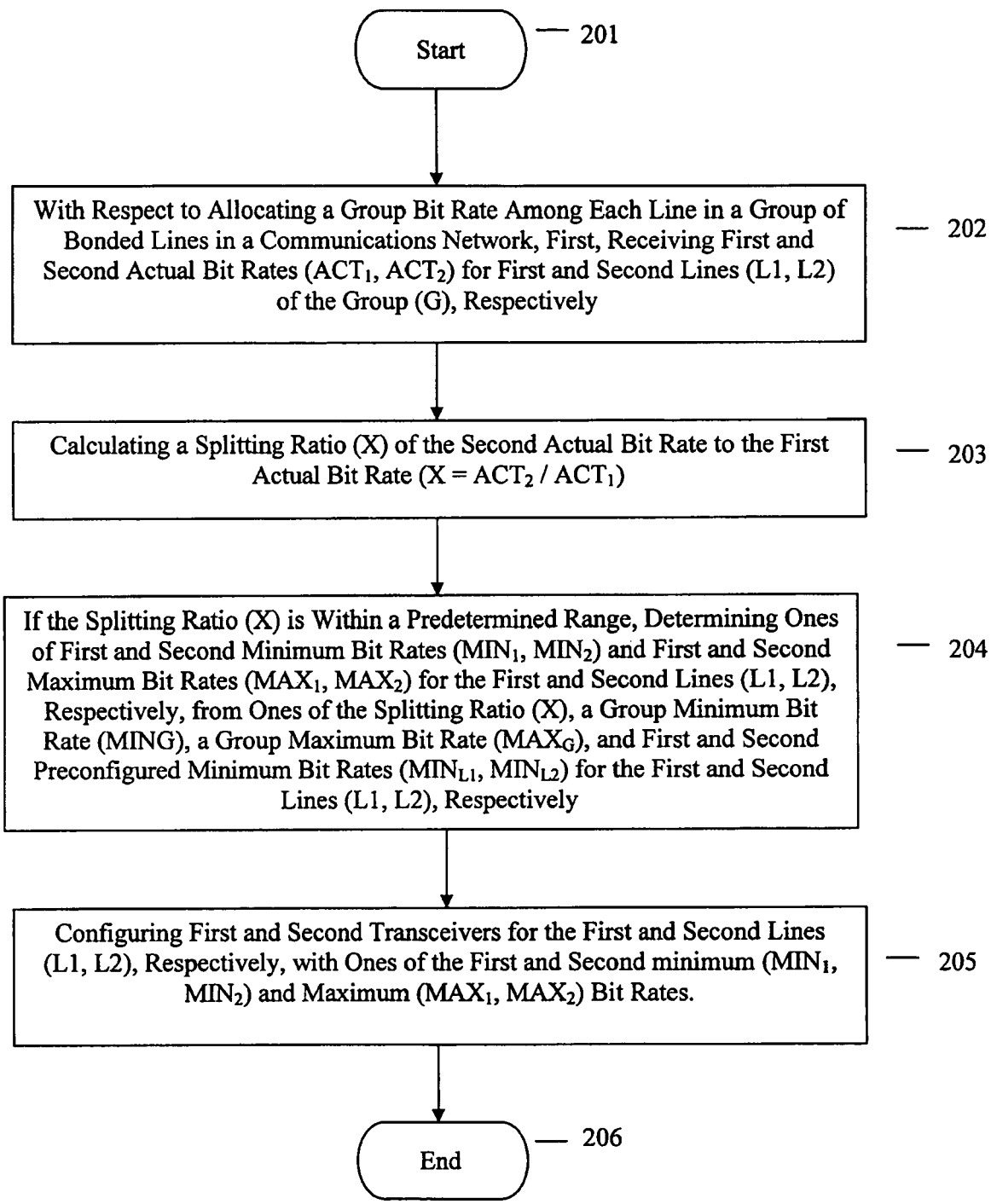

The above described method may be summarized with the aid of a flowchart. FIG. 3 is a flow chart illustrating operations 200 of modules 331 within the memory 330 of a data processing system 300 for allocating a group bit rate among each line 150, 160 in a group of bonded lines 190 in a communications network 130, in accordance with an embodiment of the invention.

At step 201, the operations 200 start.

At step 202, first and second actual bit rates ($ACT_1$, $ACT_2$) for first and second lines (L1 150, L2 160) of the group (G, 190), respectively, are received.

At step 203, a splitting ratio (X) of the second actual bit rate to the first actual bit rate (i.e., $X = ACT_2/ACT_1$) is calculated.

At step 204, if the splitting ratio (X) is within a predetermined range, ones of first and second minimum bit rates ($MIN_1$, $MIN_2$) and first and second maximum bit rates ($MAX_1$, $MAX_2$) for the first and second lines (L1 150, L2 160), respectively, are determined from ones of the splitting ratio (X), a group minimum bit rate ($MIN_G$), a group maximum bit rate ($MAX_G$), and first and second preconfigured minimum bit rates ($MIN_{L1}$, $MIN_{L2}$) for the first and second lines (L1 150, L2 160), respectively.

At step 205, first and second transceivers (e.g., $LT_i$ 140, $LT_j$ 145) for the first and second lines (L1 150, L2 160), respectively, are configured with ones of the first and second minimum ($MIN_1$, $MIN_2$) and maximum ($MAX_1$, $MAX_2$) bit rates.

At step 206, the operations 200 end.

In the above method, each line (L1 150, L2 160) may be an XDSL line and the communications network 130 may be one of an Ethernet-based network and an ATM-based network. The predetermined range may be about 4:1. The first and second actual bit rates ($ACT_1$, $ACT_2$) may be received from the first and second transceivers while operating in a second rate adaptation mode in which the first and second transceivers train to the first and second actual bit rates ($ACT_1$, $ACT_2$), respectively, given the first and second preconfigured minimum bit rates ($MIN_{L1}$, $MIN_{L2}$) and first and second initial maximum bit rates for the first and second lines (L1 150, L2 160). If the first and second transceivers are to operate in a second rate adaptation mode wherein the first and second transceivers are provided with the first and second minimum ($MIN_1$, $MIN_2$) and maximum ($MAX_1$, $MAX_2$) bit rates and train to first and second bit rates, respectively, and remain at the first and second bit rates, then: the first minimum bit rate ($MIN_1$) may be given by a maximum of the group minimum bit rate ($MIN_G$) divided by the splitting ratio plus one (X+1)

and the first preconfigured minimum bit rate ($MIN_{L1}$) (i.e., $MIN_1 = \max\{1/(1+X) \times MIN_G, MIN_{L1}\}$); the first maximum bit rate ($MAX_1$) may be given by the group maximum bit rate ($MAX_G$) divided by the splitting ratio plus one (i.e., $MAX_1 = 1/(1+X) \times MIN_G$); the second minimum bit rate ($MIN_2$) may be given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2 = \max\{X/(1+X) \times MIN_G, MIN_{L2}\}$); and, the second maximum bit rate ($MAX_2$) may be given by the group maximum bit rate ($MAX_G$) multiplied by the splitting ratio (X) divided by the splitting ratio plus one (X+1) (i.e., $MAX_2 = X/(1+X) \times MIN_G$).

Also in the above method, if the first minimum bit rate ($MIN_1$) is greater than the first maximum bit rate ($MAX_1$) (i.e., $MIN_1 > MAX_1$), then: the second minimum bit rate ($MIN_2$) may be given by a maximum of a difference between the group minimum bit rate ($MIN_G$) and the first minimum bit rate ($MIN_1$) and the second preconfigured minimum bit rate ($MIN_{L2}$) (i.e., $MIN_2 = \max\{(MIN_G - MIN_1), MIN_{L2}\}$); the splitting ratio (X) may be of the second minimum bit rate ($MIN_2$) to the first minimum bit rate ($MIN_1$) (i.e., $X = MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D = MAX_G - (MIN_1 + MIN_2) \geq 0$), then: the first maximum bit rate ($MAX_1$) may be given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1 = MIN_1 + 1/(1+X) \times MAX_D$); and, the second maximum bit rate ($MAX_2$) may be given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2 = MIN_2 + X/(1+X) \times MAX_D$).

Also in the above method, if the second minimum bit rate ($MIN_2$) is greater than the second maximum bit rate ($MAX_2$) (i.e., $MIN_2 > MAX_2$), then: the first minimum bit rate ($MIN_1$) may be given by a maximum of a difference between the group minimum bit rate ($MIN_G$) and the second minimum bit rate ($MIN_2$) and the first preconfigured minimum bit rate ($MIN_{L1}$) (i.e., $MIN_1 = \max\{(MIN_G - MIN_2), MIN_{L1}\}$); the splitting ratio (X) may be of the second minimum bit rate ($MIN_2$) to the first minimum bit rate ($MIN_1$) (i.e., $X = MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D = MAX_G - (MIN_1 + MIN_2) > 0$), then: the first maximum bit rate ($MAX_1$) may be given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1 = MIN_1 + 1/(1+X) \times MAX_D$); and, the second maximum bit rate ($MAX_2$) may be given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2 = MIN_2 + X/(1+X) \times MAX_D$).

Also in the above method, if the first and second transceivers (e.g., $LT_i$ 140, $LT_j$ 145) are to operate in a first rate adaptation mode wherein the first and second transceivers are provided with the first and second minimum bit rates ($MIN_1$, $MIN_2$) and first and second planned bit rates ($PLAN_{L1}$, $PLAN_{L2}$) for the first and second lines (L1 150, L2 160), respectively, then: the first minimum bit rate ($MIN_1$) may be given by a maximum of the group minimum bit rate ($MIN_G$) divided by the splitting ratio plus one (X+1) and the first planned bit rate ($PLAN_{L1}$) (i.e., $MIN_1 = \max\{1/(1+X) \times MIN_G, PLAN_{L1}\}$); and, the second minimum bit rate ($MIN_2$) may be given by a maximum of the group minimum bit rate ($MIN_G$) multiplied by the splitting ratio (X) divided by the splitting ratio plus one (X+1) and the second planned bit rate ($PLAN_{L2}$) (i.e., $MIN_2 = \max\{X/(1+X) \times MIN_G, PLAN_{L2}\}$).

Also in the above method, if the first transceiver (e.g., $LT_i$ 140) is to operate in a first rate adaptation mode wherein the first transceiver is provided with the first minimum bit rate ($MIN_1$) and a first planned bit rate ($PLAN_{L1}$) for the first line (L1) and if the second transceiver (e.g., $LT_j$ 145) is to operate in a second rate adaptation mode wherein the second transceiver is provided with the second minimum ($MIN_2$) and maximum ($MAX_2$) bit rates and trains to a second bit rate and remains at the second bit rate, then: the first minimum bit rate ($MIN_1$) may be given by a maximum of the group minimum bit rate ($MIN_G$) divided by the splitting ratio plus one (X+1) and the first planned bit rate ($PLAN_{L1}$) (i.e., $MIN_1 = \max\{1/(1+X) \times MIN_G, PLAN_{L1}\}$); the second minimum bit rate ($MIN_2$) may be given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2 = \max\{X/(1+X) \times MIN_G, MIN_{L2}\}$); and, the second maximum bit rate ($MAX_2$) may be given by the group maximum bit rate ($MAX_G$) less the first minimum bit rate ($MIN_1$) (i.e., $MAX_2 = MAX_G - MIN_1$).

The following is a numerical example of the above method in operation. First, assume the following configuration: $MIN_{L1} = 8{,}000$ kbit/s, $MIN_{L2} = 8{,}000$ kbit/s, $MIN_G = 12{,}000$ kbit/s, and $MAX_G = 30{,}000$ kbit/s. Thus, we have the following:

$MIN_1 = MIN_{L1} = 8{,}000$ kbit/s;
$MAX_1 = 65{,}535$ kbit/s;
$MIN_2 = MIN_{L2} = 8{,}000$ kbit/s; and,
$MAX_2 = 65{,}535$ kbit/s, Note that the initial values for $MAX_1$ and $MAX_2$ may take on other values depending on the implementation. Now, at step 202, assume that $ACT_1 = 10{,}000$ kbit/s and $ACT_2 = 20{,}000$ kbit/s are received. Thus, at step 203 we have:

$X = ACT_2/ACT_1 = 20{,}000/10{,}000 = 2$

Since $X = 2$ is within a ratio of 4:1, and assuming the RA Mode 2 rate adaptation mode, at step 204 we have:

$MIN_1 = \max\{1/(1+X) \times MIN_G, MIN_{L1}\} = \max[1/(1+2) \times 12000, 8000] = 8{,}000$ kbit/s;
$MAX_1 = 1/(1+X) \times MAX_G = 1/(1+2) \times 30000 = 10{,}000$ kbit/s;
$MIN_2 = \max\{X/(1+X) \times MIN_G, MIN_{L2}\} = \max\{1/(1+2) \times 12000, 8000\} = 8{,}000$ kbit/s; and,
$MAX_2 = X/(1+X) \times MAX_G = 2/(1+2) \times 30000 = 20{,}000$ kbit/s.

Finally, at step 204, the first and second transceivers (e.g., $LT_i$ 140, $LT_j$ 145) are trained with $MIN_1 = 8{,}000$ kbit/s, $MAX_1 = 10{,}000$ kbit/s, $MIN_2 = 8{,}000$ kbit/s, and $MAX_2 = 20{,}000$ kbit/s.

According to one embodiment of the invention, the above described method may be implemented by a NE or data processing system that is remote from the CO rather than by a NE 110 or data processing system 300 that is located at the CO.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in a data carrier product according to one embodiment of the invention. This data carrier product can be loaded into and run by the data processing system 300 of FIG. 2. In addition, the sequences of instructions which when executed cause the method described herein to be performed by the data processing system 300 of FIG. 2 can be contained in a computer software product according to one embodiment of the invention. This computer software product can be loaded into and run by the data processing system 300 of FIG. 2. Moreover, the sequences of instructions which when executed cause the method described herein to be performed by the data processing system 300 of FIG. 2 can be contained in an integrated circuit product (e.g., hardware modules) including a coprocessor or memory according to one embodiment of the invention. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method in a memory unit of a data processing unit for allocating a group bit rate among each line in a group of bonded lines in a communications network, the method comprising:

receiving, by a first module in the memory, first and second actual bit rates ($ACT_1$, $ACT_2$) for first and second lines (L1, L2) of the group (G), respectively;

calculating, by a second module in the memory, a splitting ratio (X) of the second actual bit rate to the first actual bit rate ($X=ACT_2/ACT_1$);

if the splitting ratio (X) is within a predetermined range, determining, by a third module in the memory, ones of first and second minimum bit rates ($MIN_1$, $MIN_2$) and first and second maximum bit rates ($MAX_1$, $MAX_2$) for the first and second lines (L1, L2), respectively, from ones of the splitting ratio (X), a group minimum bit rate ($MIN_G$), a group maximum bit rate ($MAX_G$), and first and second preconfigured minimum bit rates ($MIN_{L1}$, $MIN_{L2}$) for the first and second lines (L1, L2), respectively; and, configuring, by a fourth module the memory, first and second transceivers for the first and second lines (L1, L2), respectively, with ones of the first and second minimum ($MIN_1$, $MIN_2$) and maximum ($MAX_1$, $MAX_2$) bit rates.

2. The method of claim 1 wherein each line (L1, L2) is an XDSL line and the communications network is one of an Ethernet-based network and an ATM-based network.

3. The method of claim 2 wherein the predetermined range is about 4:1.

4. The method of claim 3 wherein the first and second actual bit rates ($ACT_1$, $ACT_2$) are received from the first and second transceivers while operating in a second rate adaptation mode in which the first and second transceivers train to the first and second actual bit rates ($ACT_1$, $ACT_2$), respectively, given the first and second preconfigured minimum bit rates ($MIN_{L1}$, $MIN_{L2}$) and first and second initial maximum bit rates for the first and second lines (L1, L2).

5. The method of claim 3 wherein if the first and second transceivers are to operate in a second rate adaptation mode wherein the first and second transceivers are provided with the first and second minimum ($MIN_1$, $MIN_2$) and maximum ($MAX_1$, $MAX_2$) bit rates and train to first and second bit rates, respectively, and remain at the first and second bit rates, then: the first minimum bit rate ($MIN_1$) is given by a maximum of the group minimum bit rate ($MIN_G$) divided by the splitting ratio plus one (X+1) and the first preconfigured minimum bit rate ($MIN_{L1}$) (i.e., $MIN_1=\max\{1/(1=X)\times MIN_G, MIN_{L1}\}$); the first maximum bit rate ($MAX_1$) is given by the group maximum bit rate ($MAX_G$) divided by the splitting ratio plus one (i.e., $MAX_1 1/(1+X)\times MIN_G$); the second minimum bit rate ($MIN_2$) is given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2=\max\{X/(1+X)\times MIN_G, MIN_{L2}\}$); and, the second maximum bit rate ($MAX_2$) is given by the group maximum bit rate ($MAX_G$) multiplied by the splitting ratio (X) divided by the splitting ratio plus one (X+1) (i.e., $MAX_2=X/(1+X)\times MIN_G$).

6. The method of claim 5 wherein if the first minimum bit rate ($MIN_1$) is greater than the first maximum bit rate ($MAX_1$) (i.e., $MIN_1>MAX_1$), then: the second minimum bit rate ($MIN_2$) is given by a maximum of a difference between the group minimum bit rate ($MIN_G$) and the first minimum bit rate ($MIN_G$) and the second preconfigured minimum bit rate ($MIN_{L2}$) (i.e., $MIN_2=\max\{(MIN_G-MIN_1), MIN_{L2}\}$); the splitting ratio (X) is of the second minimum bit rate ($MIN_2$) to the first minimum bit rate ($MIN_1$) (i.e., $X=MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D=MAX_G-(MIN_1+MIN_2)\geq 0$), then: the first maximum bit rate ($MAX_1$) is given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1=MIN_1+1/(1+X)\times MAX_D$); and, the second maximum bit rate ($MAX_2$) is given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2=MIN_2+X/(1+X)\times MAX_D$).

7. The method of claim 5 wherein if the second minimum bit rate ($MIN_2$) is greater than the second maximum bit rate ($MAX_2$) (i.e., $MIN_2>MAX_2$), then: the first minimum bit rate ($MIN_1$) is given by a maximum of a difference between the group minimum bit rate ($MIN_G$) and the second minimum bit rate ($MIN_2$) and the first preconfigured minimum bit rate ($MIN_{L1}$) (i.e., $MIN_1=\max\{(MIN_G-MIN_2), MIN_{L1}\}$); the splitting ratio (X) is of the second minimum bit rate ($MIN_2$) to the first minimum bit rate ($MIN_1$) (i.e., $X=MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D=MAX_G-(MIN_1+MIN_2)\geq 0$), then: the first maximum bit rate ($MAX_1$) is given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1=MIN_1+1/(I+X)\times MAX_D$); and, the second maximum bit rate ($MAX_2$) is given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2=MIN_2-X/(1+X) \times MAX_D$).

8. The method of claim 3 wherein if the first and second transceivers are to operate in a first rate adaptation mode wherein the first and second transceivers are provided with the first and second minimum bit rates ($MIN_1$, $MIN_2$) and first and second planned bit rates ($PLAN_{L1}$, $PLAN_{L2}$) for the first and second lines (L1, L2), respectively, then: the first minimum bit rate ($MIN_1$) is given by a maximum of the group minimum bit rate ($MIN_G$) divided by the splitting ratio plus one (X+1) and the first planned bit rate ($PLAN_{L1}$) (i.e., $MIN_1=\max\{1/(1+X) \times MIN_G, PLAN_{L1}\}$); and, the second minimum bit rate ($MIN_2$) is given by a maximum of the group minimum bit rate ($MIN_G$) multiplied by the splitting ratio (X) divided by the splitting ratio plus one (X+1) and the second planned bit rate ($PLAN_{L2}$) (i.e., $MIN_2=\max\{X/(1+X) \times MIN_G, PLAN_{L2}\}$).

9. The method of claim 3 wherein if the first transceiver is to operate in a first rate adaptation mode wherein the first transceiver is provided with the first minimum bit rate ($MIN_1$) and a first planned bit rate ($PLAN_{L1}$) for the first line (L1) and if the second transceiver is to operate in a second rate adaptation mode wherein the second transceiver is provided with the second minimum ($MIN_2$) and maximum ($MAX_2$) bit rates and trains to a second bit rate and remains at the second bit rate, then: the first minimum bit rate ($MIN_1$) is given by a maximum of the group minimum bit rate ($MIN_G$) divided by the splitting ratio plus one (X+1) and the first planned bit rate ($PLAN_{L1}$) (i.e., $MIN_1=\max\{1/(1+X) \times MIN_G, PLAN_{L1}\}$); the second minimum bit rate ($MIN_2$) is given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_{2=\max \{X/(}1+X) \times MIN_G, MIN_{L2}\}$); and, the second maximum bit rate ($MAX_2$) is given by the group maximum bit rate ($MAX_G$) less the first minimum bit rate ($MIN_1$) (i.e., $MAX_2=MAX_G-MIN_1$).

10. A system for allocating a group bit rate among each line in a group of bonded lines in a communications network, the system comprising:
 a processor coupled to memory and first and second transceivers for the first and second lines (L1, L2), respectively; and,
 modules within the memory and executed by the processor, the modules including:
 a module for receiving first and second actual bit rates ($ACT_1$, $ACT_2$) for first and second lines (L1, L2) of the group (G), respectively;
 a module for calculating a splitting ratio (X) of the second actual bit rate to the first actual bit rate ($X=ACT_2/ACT_1$);
 a module for, if the splitting ratio (X) is within a predetermined range, determining ones of first and second minimum bit rates ($MIN_1$, $MIN_2$) and first and second maximum bit rates ($MAX_1$, $MAX_2$) for the first and second lines (L1, L2), respectively, from ones of the splitting ratio (X), a group minimum bit rate ($MIN_G$), a group maximum bit rate ($MAX_G$), and first and second preconfigured minimum bit rates ($MIN_{L1}$, $MIN_{L2}$) for the first and second lines (L1, L2), respectively; and,
 a module for configuring the first and second transceivers with ones of the first and second minimum ($MIN_1$, $MIN_2$) and maximum ($MAX_1$, $MAX_2$) bit rates.

11. The system of claim 10 wherein each line (L1, L2) is an XDSL line and the communications network is one of an Ethernet-based network and an ATM-based network.

12. The system of claim 11 wherein the predetermined range is about 4:1.

13. The system of claim 12 wherein the first and second actual bit rates ($ACT_1$, $ACT_2$) are received from the first and second transceivers while operating in a second rate adaptation mode in which the first and second transceivers train to the first and second actual bit rates ($ACT_1$, $ACT_2$), respectively, given the first and second preconfigured minimum bit rates ($MIN_{L1}$, $MIN_{L2}$) and first and second initial maximum bit rates for the first and second lines (L1, L2).

14. The system of claim 12 wherein if the first and second transceivers are to operate in a second rate adaptation mode wherein the first and second transceivers are provided with the first and second minimum ($MIN_1$, $MIN_2$) and maximum ($MAX_1$, $MAX_2$) bit rates and train to first and second bit rates, respectively, and remain at the first and second bit rates, then: the first minimum bit rate ($MIN_1$) is given by a maximum of the group minimum bit rate ($MIN_G$) divided by the splitting ratio plus one (X+1) and the first preconfigured minimum bit rate ($MIN_{L1}$) (i.e., $MIN_1=\max\{1/(1+X) \times MIN_G, MIN_{L1}\}$); the first maximum bit rate ($MAX_1$) is given by the group maximum bit rate ($MAX_G$) divided by the splitting ratio plus one (i.e., $MAX_1=1/(1+X) \times MIN_G$); the second minimum bit rate ($MIN_2$) is given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2=\max\{X/(1+X) \times MIN_G, MIN_{L2}\}$); and, the second maximum bit rate ($MAX_2$) is given by the group maximum bit rate ($MAX_G$) multiplied by the splitting ratio (X) divided by the splitting ratio plus one (X+1)(i.e., $MAX_2=X/(1+X) \times MIN_G$).

15. The system of claim 14 wherein if the first minimum bit rate ($MIN_1$) is greater than the first maximum bit rate ($MAX_1$) (i.e., $MIN_1 > MAX_1$, then: the second minimum bit rate ($MIN_2$) is given by a maximum of a difference between the group minimum bit rate ($MIN_G$) and the first minimum bit rate ($MIN_1$) and the second preconfigured minimum bit rate ($MIN_{L2}$) (i.e., $MIN_2=\max\{(MIN_G-MIN_l), MIN_{L2}\}$); the splitting ratio (X) is of the second minimum bit rate ($MIN_2$) to the first minimum bit rate ($MIN_1$) (i.e., $X=MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D=MAX_G-(MIN_{1+MIN2}) \geq 0$), then: the first maximum bit rate ($MAX_1$) is given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1=MIN_1+1/(1+X) \times MAX_D$); and, the second maximum bit rate ($MAX_2$) is given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2=MIN_2+X/(1+X) \times MAX_D$).

16. The system of claim 14 wherein if the second minimum bit rate ($MIN_2$) is greater than the second maximum bit rate ($MAX_2$) (i.e., $MIN_2 > MAX_2$), then: the first minimum bit rate ($MIN_1$) is given by a maximum of a difference between the group minimum bit rate ($MIN_G$) and the second minimum bit rate ($MIN_2$) and the first preconfigured minimum bit rate ($MIN_{L1}$) (i.e., $MIN_1=\max \{(MIN_G-MIN_2) MIN_{L1}\}$); the splitting ratio (X) is of the second minimum bit rate ($MIN_2$) to the first minimum bit rate ($MIN_1$) (i.e., $X=MIN_2/MIN_1$); and, if the group maximum bit rate ($MAX_G$) less the first minimum bit rate ($MIN_1$) added to the second minimum bit rate ($MIN_2$) is greater than or equal to zero (i.e., $MAX_D=MAX_G-(MIN_1+MIN_2)>0$), then: the first maximum bit rate ($MAX_1$) is given by the first minimum bit rate ($MIN_1$) plus the group maximum bit rate ($MAX_G$) less the first minimum bit rate ($MIN_1$) added to the second minimum bit rate ($MIN_2$) divided by the splitting ratio plus one (X+1) (i.e., $MAX_1=MIN_1+1/(1+X) \times MAX_D$); and, the second maximum bit rate ($MAX_2$) is given by the second minimum bit rate ($MIN_2$) plus the group maximum bit rate ($MAX_G$) less the first minimum bit rate ($MIN_1$) added to the second minimum bit rate ($MIN_2$) multiplied by the splitting ratio (X) divided by the splitting ratio plus one (X+1) (i.e., $MAX_2=MIN_2+X/(1+X) \times MAX_D$).

17. The system of claim 12 wherein if the first and second transceivers are to operate in a first rate adaptation mode wherein the first and second transceivers are provided with the first and second minimum bit rates ($MIN_1$, $MIN_2$) and first and second planned bit rates ($PLAN_{L1}$, $PLAN_{L2}$) for the first and second lines (L1, L2), respectively, then: the first minimum bit rate ($MIN_1$) is given by a maximum of the group minimum bit rate ($MIN_G$) divided by the splitting ratio plus one (X+1) and the first planned bit rate ($PLAN_{L1}$) (i.e., $MIN_1=\max\{1/(1+X) \times MIN_G, PLAN_{L1}\}$); and, the second minimum bit rate ($MIN_2$) is given by a maximum of the group minimum bit rate ($MIN_G$) multiplied by the splitting ratio (X) divided by the splitting ratio plus one (X+1) and the second planned bit rate ($PLAN_{L2}$) (i.e., $MIN_2=\max\{X/(1+X) \times MIN_G, PLAN_{L2}\}$).

18. The system of claim 12 wherein if the first transceiver is to operate in a first rate adaptation mode wherein the first transceiver is provided with the first minimum bit rate ($MIN_1$) and a first planned bit rate ($PLAN_{L1}$) for the first line (L1) and if the second transceiver is to operate in a second rate adaptation mode wherein the second transceiver is provided with the second minimum ($MIN_2$) and maximum ($MAX_2$) bit rates and trains to a second bit rate and remains at the second bit rate, then: the first minimum bit rate ($MIN_1$) is given by a maximum of the group minimum bit rate ($MIN_G$) divided by the splitting ratio plus one (X+1) and the first planned bit rate ($PLAN_{L1}$) (i.e., $MIN_1=\max\{1/(1+X) \times MIN_G, PLAN_{L1}\}$); the second minimum bit rate ($MIN_2$) is given by a maximum of the group minimum bit rate ($MIN_G$) multiplied by the splitting ratio (X) divided by the splitting ratio plus one (X+1) and the second preconfigured minimum bit rate ($MIN_{L2}$) (i.e., $MIN_2=\max\{X/(1+X) \times MIN_G, MIN_{L2}\}$); and, the second maximum bit rate ($MAX_2$) is given by the group maximum bit rate ($MAX_G$) less the first minimum bit rate ($MIN_1$) (i.e., $MAX_2=MAX_G-MIN_1$).

* * * * *

UNITED STATES PATENT AND TRADEMARK OFFICE
CERTIFICATE OF CORRECTION

PATENT NO. : 7,573,834 B2
APPLICATION NO. : 11/443413
DATED : August 11, 2009
INVENTOR(S) : Bo Liu et al.

It is certified that error appears in the above-identified patent and that said Letters Patent is hereby corrected as shown below:

Column 14, line 10 "(1=X)" should be --(1+X)--
Column 14, line 15 needs to add --=-- before "1/(1+X)"
Column 15, line 65 "(-)" should be --+--

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,573,834 B2 Page 1 of 1
APPLICATION NO. : 11/443413
DATED : August 11, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Seventh Day of September, 2010

David J. Kappos
*Director of the United States Patent and Trademark Office*